(12) United States Patent
Rodriguez et al.

(10) Patent No.: US 8,205,606 B2
(45) Date of Patent: Jun. 26, 2012

(54) MODEL FOR INFERRING TEMPERATURE OF EXHAUST GAS AT AN EXHAUST MANIFOLD USING TEMPERATURE MEASURED AT ENTRANCE OF A DIESEL OXIDATION CATALYST

(75) Inventors: Rogelio Rodriguez, Plainfield, IL (US); Smitha Vempaty, Elmhurst, IL (US); Tashmin Lopa, Naperville, IL (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 493 days.

(21) Appl. No.: 12/497,213

(22) Filed: Jul. 2, 2009

(65) Prior Publication Data
US 2010/0058747 A1    Mar. 11, 2010

Related U.S. Application Data (60) Provisional application No. 61/078,135, filed on Jul. 3, 2008.

(51) Int. Cl.
*F02M 25/07* (2006.01)

(52) U.S. Cl. ............... 123/676; 123/568.21; 123/568.31; 60/297; 73/114.74

(58) Field of Classification Search ................... 123/676, 123/568.11, 568.16, 568.21, 568.31; 60/297, 60/274, 276, 285; 73/114.69, 114.74
See application file for complete search history.

(56) References Cited

U.S. PATENT DOCUMENTS

| | | | |
|---|---|---|---|
| 5,303,168 A * | 4/1994 | Cullen et al. ................. | 700/299 |
| 5,647,203 A * | 7/1997 | Abe et al. ..................... | 60/274 |
| 6,401,700 B2 | 6/2002 | Balekai | |
| 6,418,719 B2 | 7/2002 | Terry | |
| 6,722,121 B2 | 4/2004 | Gui | |
| 6,801,846 B1 | 10/2004 | Rodriguez | |
| 6,826,905 B2 | 12/2004 | Gui | |
| 6,829,890 B2 | 12/2004 | Gui | |
| 6,973,786 B1 | 12/2005 | Liu | |
| 6,978,604 B2 | 12/2005 | Wang | |
| 7,131,271 B2 | 11/2006 | Bulicz | |
| 7,152,588 B2 | 12/2006 | Corba | |
| 7,210,469 B1 | 5/2007 | Saele | |
| 7,257,950 B2 | 8/2007 | Iwaszkiewicz | |
| 7,281,529 B2 | 10/2007 | Lew | |
| 7,299,626 B2 * | 11/2007 | Barasa et al. ................ | 60/297 |
| 7,308,788 B1 | 12/2007 | Das | |
| 7,311,090 B2 | 12/2007 | Lyons | |
| 7,353,648 B2 | 4/2008 | Zhang | |
| 7,484,503 B2 | 2/2009 | Wyatt | |
| 7,530,220 B2 | 5/2009 | Miller | |
| 7,533,519 B2 | 5/2009 | McNulty | |
| 7,861,516 B2 * | 1/2011 | Allansson et al. ............ | 60/286 |

(Continued)

*Primary Examiner* — John Kwon
(74) *Attorney, Agent, or Firm* — Mark C. Bach; Jeffrey P. Calfa (57) ABSTRACT

An engine processor (38) processes data for inferring temperature of exhaust gas at an exhaust manifold (18) of an internal combustion engine (10) whose exhaust system (16) contains an after-treatment device (26, 28) for treating exhaust gas and a sensor (30) for providing data for temperature of exhaust gas entering the after-treatment device. The processor processes data from the sensor and other data to infer temperature of exhaust gas at the exhaust manifold by executing an algorithm (FIGS. 3 and 4) that models temperature of exhaust gas at the exhaust manifold as a function of data from the sensor and the other data, including certain constants, certain geometry of the exhaust system, and certain variables related to operation of the engine.

8 Claims, 6 Drawing Sheets

U.S. PATENT DOCUMENTS

| | | |
|---|---|---|
| 2005/0097885 A1 | 5/2005 | Wang |
| 2006/0200297 A1 | 9/2006 | Liu |
| 2006/0201141 A1 | 9/2006 | Miller |
| 2007/0044472 A1 | 3/2007 | Zhang |
| 2007/0056282 A1 | 3/2007 | Iwaszkiewicz |
| 2007/0101699 A1 | 5/2007 | McNulty |
| 2007/0175457 A1 | 8/2007 | Lyons |
| 2007/0193258 A1 | 8/2007 | Berke |
| 2007/0199320 A1 | 8/2007 | Yager |
| 2008/0027626 A1* | 1/2008 | Inoue .......................... 701/108 |
| 2008/0028750 A1 | 2/2008 | Zukouski |
| 2008/0078176 A1 | 4/2008 | de Ojeda |
| 2008/0148727 A1 | 6/2008 | de Ojeda |
| 2008/0184696 A1 | 8/2008 | Wyatt |
| 2008/0229744 A1 | 9/2008 | Gronberg |
| 2008/0314371 A1 | 12/2008 | Wyatt |
| 2009/0094966 A1 | 4/2009 | Huslig |
| 2009/0165446 A1* | 7/2009 | Haseyama et al. .............. 60/286 |
| 2009/0183494 A1* | 7/2009 | Iwashita et al. ................ 60/286 |

* cited by examiner

DETAILS OF THERMODYNAMIC CONSTANTS USED IN EGC MODEL

| EGT MODEL FUNCTION BLOCK | THERMODYAMIC CONSTANTS | THERMODYNAMIC CONSTANT DEFINITIONS | THERMODYNAMIC CONSTANT UNITS |
|---|---|---|---|
| THERMODYNAMIC CONSTANTS USED IN EGC MODEL_ TURBO DOWN PIPE CONVECTION AND RADIATION HEAT TRANSFER | K | THERMAL CONDUCTIVITY OF AIR | Btu/hr-ft-F |
|  | U | VELOCITY OF AIR FLOW IN THE TURBO DOWNPIPE | ft/s |
|  | v | KINEMATICS VISCOSITY IS RATIO OF THE VISCOUS FORCE TO THE INERTIAL FORCE (FUNCTION OF TEMPERATURE) | ft^2/s |
|  | $C_\rho$ | SPECIFIC HEAT AT CONSTANT PRESSURE | Btu/Degree F*lb |
|  | μ | VISCOSITY OF AIR (lbm/ft sec) |  |
|  | Pr | PRANDTL NUMBER IS THE RATIO OF MOMENTUM DIFFUSITY-KINEMATIC VISCOSIT, $v=\mu/\rho$ AND THERMAL DIFFUSITY, $\alpha=k/\rho C_\rho$  $Pr=v/\alpha+C_\rho*\mu/k$ |  |
| THERMODYNAMIC CONSTANTS USED IN EGC MODEL_ TURBOCHARGER TURBINE HEAT EXPANSION MODEL | γ | RATIO OF SPECIFIC HEATS (IT IS THE RATION OF THE HEAT CAPICITY AT CONSTANT PRESSURE TO HEAT CAPACITY AT CONSTANT VOLUME) $\frac{C_\rho}{C_\gamma}$ |  |

MODEL FOR INFERRING TEMPERATURE OF EXHAUST GAS AT AN EXHAUST MANIFOLD USING TEMPERATURE MEASURED AT ENTRANCE OF A DIESEL OXIDATION CATALYST

REFERENCE TO RELATED APPLICATION AND PRIORITY CLAIM

This application claims the priority of Provisional Patent Application No. 61/078,135, filed on 3 Jul. 2008, the entire content of which is incorporated herein by reference.

TECHNICAL FIELD

The subject matter of this disclosure relates to internal combustion engines, especially diesel engines like those used to propel large trucks. In particular it relates to a strategy for inferring temperature of exhaust gas at an engine exhaust manifold from a measured temperature of exhaust gas entering a diesel oxidation catalyst (DOC) and using the inferred temperature as an engine control parameter, such as for control of recirculation of exhaust gas through an exhaust gas recirculation (EGR) system.

BACKGROUND OF THE DISCLOSURE

A representative diesel engine comprises an exhaust system through which diesel exhaust gas is conveyed from the engine's cylinders to the tailpipe where it enters the surrounding atmosphere. Before passing through and out of the tailpipe, the exhaust gas is treated by an after-treatment system that comprises one or more after-treatment devices. Examples of such devices are diesel oxidation catalysts (DOC's) and diesel particulate filters (DPF's).

Diesel engines that are manufactured today for use in automotive vehicles such as trucks are typically turbocharged. Heat energy in exhaust gas leaving an engine exhaust manifold is converted into mechanical energy as it passes through a turbine portion of a turbocharger to operate a compressor in the compression portion that draws air into the intake system to deliver charge air to the engine cylinders.

For controlling NOx content in the exhaust gas, a portion of the exhaust gas can be recirculated from the exhaust system through an EGR system to the intake system. When the entrance to an EGR system is upstream of the turbocharger turbine, it may be appropriate for the EGR system to comprise one or more heat exchangers for cooling the exhaust gas being recirculated. Cooling of the exhaust gas can increase the effectiveness of the EGR system in limiting the generation of NOx.

However, it is recognized in the industry that cooling of recirculated exhaust gas creates the potential for condensation of certain gaseous constituents in the exhaust gas. Over time such condensates may accumulate sufficiently to have a detrimental effect on performance and/or components. For example, coolant passageways in coolers may become restricted, components may corrode, and moving parts may stick.

Condensation may be more extreme and/or perhaps even unavoidable at certain times, such as when a cold-soaked engine is warming after having been started and portions of its EGR system have not yet reached operating temperature. When condensation occurs along an EGR flow path and temperature of surrounding parts is sufficiently low, condensate may freeze and consequently restrict, or even block, the flow until the parts warm sufficiently to thaw the frozen condensate.

Condensation may also occur regardless of whether any cooler is present in the EGR system, for example when the engine is running at low idle and exhaust gas temperatures are low.

To address such situations, known practices in EGR control strategies include delaying and/or limiting EGR when conditions are conducive for condensation, and while such measures may be helpful in slowing the accumulation of condensates as an engine ages, they do impact the quantity of NOx in tailpipe emissions.

SUMMARY OF THE DISCLOSURE

A temperature sensor associated with a diesel oxidation catalyst, or DOC, provides a measurement of the temperature of engine exhaust gas entering the DOC as an input to a processor in an engine controller. The present disclosure describes a model that enables the temperature of exhaust gas at the exhaust manifold to be inferred, or estimated, from the temperature measured by the sensor. The model is embodied, by way of illustration, as an algorithm that is executed by the processor.

Briefly, the model processes data for a number of parameters related to engine operation, to ambient conditions, and to exhaust system characteristics such as its geometry. Some parameters are constants; others are variables, such as engine speed and load, that are taken into account because exhaust gas temperature will vary as engine operation changes, and variables, such as air temperature and barometric pressure, which change with changing ambient conditions.

A general aspect of the disclosure relates to an internal combustion engine comprising an exhaust system which conveys exhaust gas created in engine combustion chambers to atmosphere and which comprises an exhaust manifold through which exhaust gas enters from the combustion chambers, an after-treatment device for treating exhaust gas before passing into the atmosphere, and a sensor providing data for temperature of exhaust gas entering the after-treatment device.

A processor comprises an algorithm that models temperature of exhaust gas at the exhaust manifold as a function of the data from the sensor and other data, including certain thermodynamic constants, certain geometry of the exhaust system, and certain variables related to operation of the engine, and that when executed, processes the data from the sensor and the other data to calculate temperature of exhaust gas at the exhaust manifold.

Another general aspect relates to a method for inferring temperature of exhaust gas at an exhaust manifold of an internal combustion engine that has an exhaust system comprising an after-treatment device for treating exhaust gas passing through the exhaust system from the exhaust manifold and a sensor providing data for temperature of exhaust gas entering the after-treatment device.

The method comprises processing the data from the sensor and other data to infer temperature of exhaust gas at the exhaust manifold by executing an algorithm that models temperature of exhaust gas at the exhaust manifold as a function of data from the sensor and the other data, including certain constants, certain geometry of the exhaust system, and certain variables related to operation of the engine.

DETAILED DESCRIPTION

Figure 1:
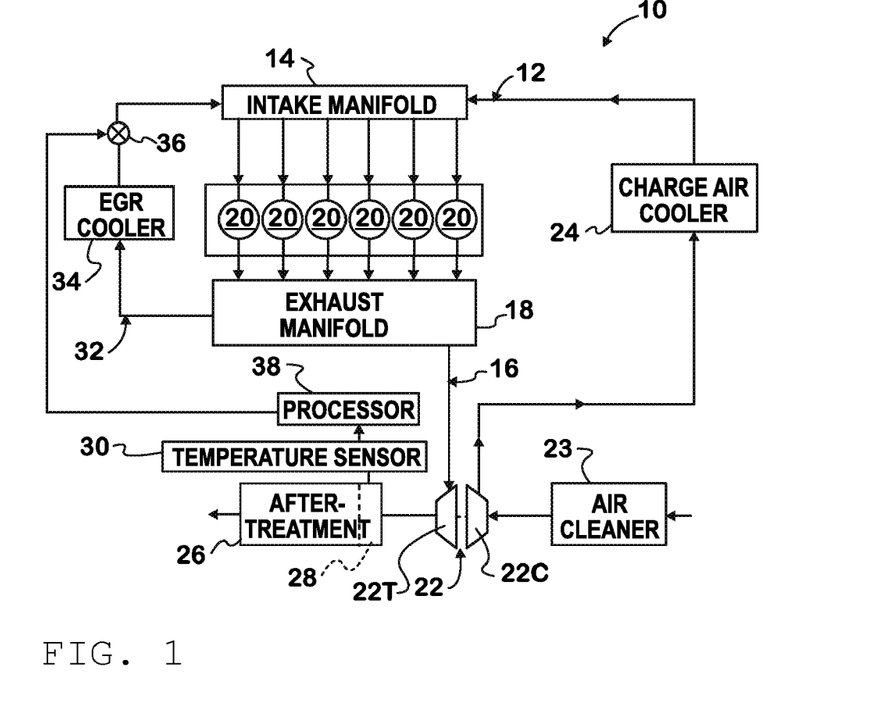
FIG. 1 is a general schematic diagram that is representative of portions of a diesel engine in a motor vehicle.

FIG. 1 shows an example of a turbocharged diesel engine 10 having an intake system 12, including an intake manifold 14, through which charge air enters, and an exhaust system 16, including an exhaust manifold 18, through which exhaust gas resulting from combustion exits, not all details of those two systems that are typically present being shown.

Engine 10 also comprises a number of cylinders 20 forming combustion chambers into which fuel is injected by fuel injectors to combust with the charge air that has entered from intake manifold 14. Energy released by combustion in cylinders 20 powers the engine via pistons connected to a crankshaft (not specifically shown).

When used in a motor vehicle, such as a truck, engine 10 is coupled through a drivetrain to driven wheels that propel the vehicle. Intake valves control the admission of charge air into cylinders 20 from intake manifold 14, and exhaust valves control the outflow of exhaust gas into exhaust manifold 18, through exhaust system 16, and ultimately to ambient atmosphere via a tailpipe.

Turbocharging is provided by a turbocharger 22 that comprises a turbine 22T for converting heat energy in exhaust gas passing through the turbine after leaving exhaust manifold 18 into mechanical energy as to operate a compressor 22C that draws air into intake system 12 through an air cleaner 23 to deliver charge air for cylinders 20. Because the compression of the air elevates its temperature, the compressed air flows through a charge air cooler 24 where some of the heat is rejected before the charge air enters cylinders 20.

After leaving turbine 22T and before entering the atmosphere, the exhaust gas is treated by one or more after-treatment devices in an after-treatment system 26 that includes a DOC 28 and a temperature sensor 30 for measuring temperature of exhaust gas entering the DOC.

Engine 10 also comprises an EGR system 32 for recirculating some exhaust gas from exhaust system 16 successively through a cooler 34 and an EGR control valve 36 to intake system 12 for entrainment with the charge air flow to cylinders 20. EGR valve 36 meters an appropriate amount of exhaust gas into fresh air passing through intake system 12 so that the air is diluted, consequently limiting in-cylinder temperatures and the quantity of NOx in the exhaust gas created by combustion.

For inferring the temperature of exhaust gas leaving manifold 18 to enter EGR system 32, the temperature of exhaust gas measured by sensor 30 is processed by a processor 38 according to a mathematical model that will be described with reference to FIGS. 2 through 10.

Figure 2:
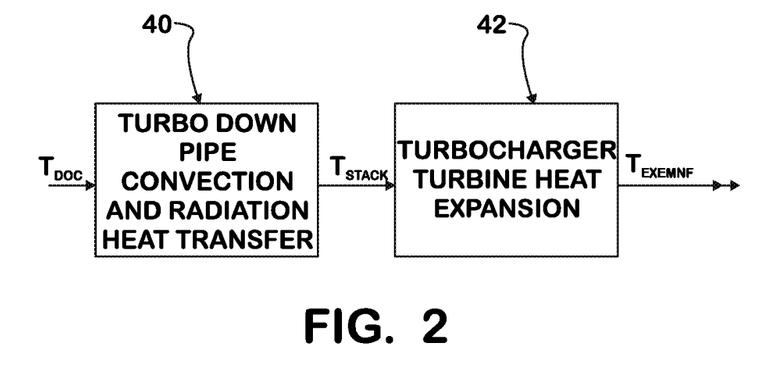
FIG. 2 is a general block diagram of the strategy that is the subject of this disclosure.

For modeling temperature of exhaust gas at exhaust manifold 18, heat lost during passage through the turbo down pipe from turbine 22T and heat lost in turbine 22T are modeled, as indicated by the respective heat-loss models shown in blocks 40 and 42 respectively of FIG. 2. Exhaust manifold temperature $T_{ExhMnf}$ is considered to equate to the sum of temperature measured by sensor 30, temperature lost during passage through the turbo down pipe, and temperature lost during passage through turbine 22T.

Heat loss through the turbo down pipe comprises a radiant component and a convective component. The convective component is large in comparison to the radiant component. Heat loss through turbine 22T is due predominantly to work that it performs to operate compressor 22C.

Figure 3A:
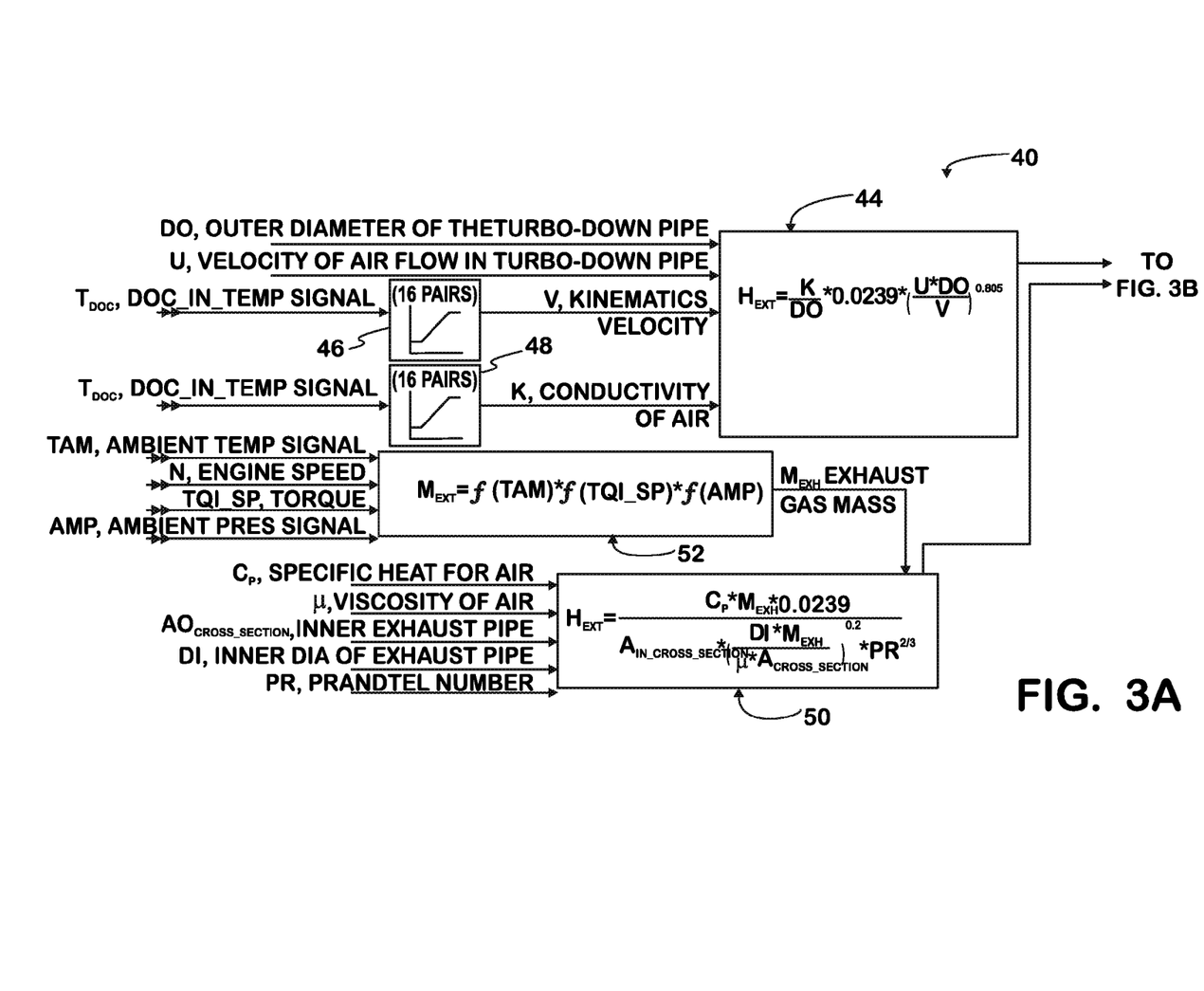
FIGS. 3A and 3B are schematic diagrams showing more detail of one of the blocks of FIG. 2.
Figure 3B:
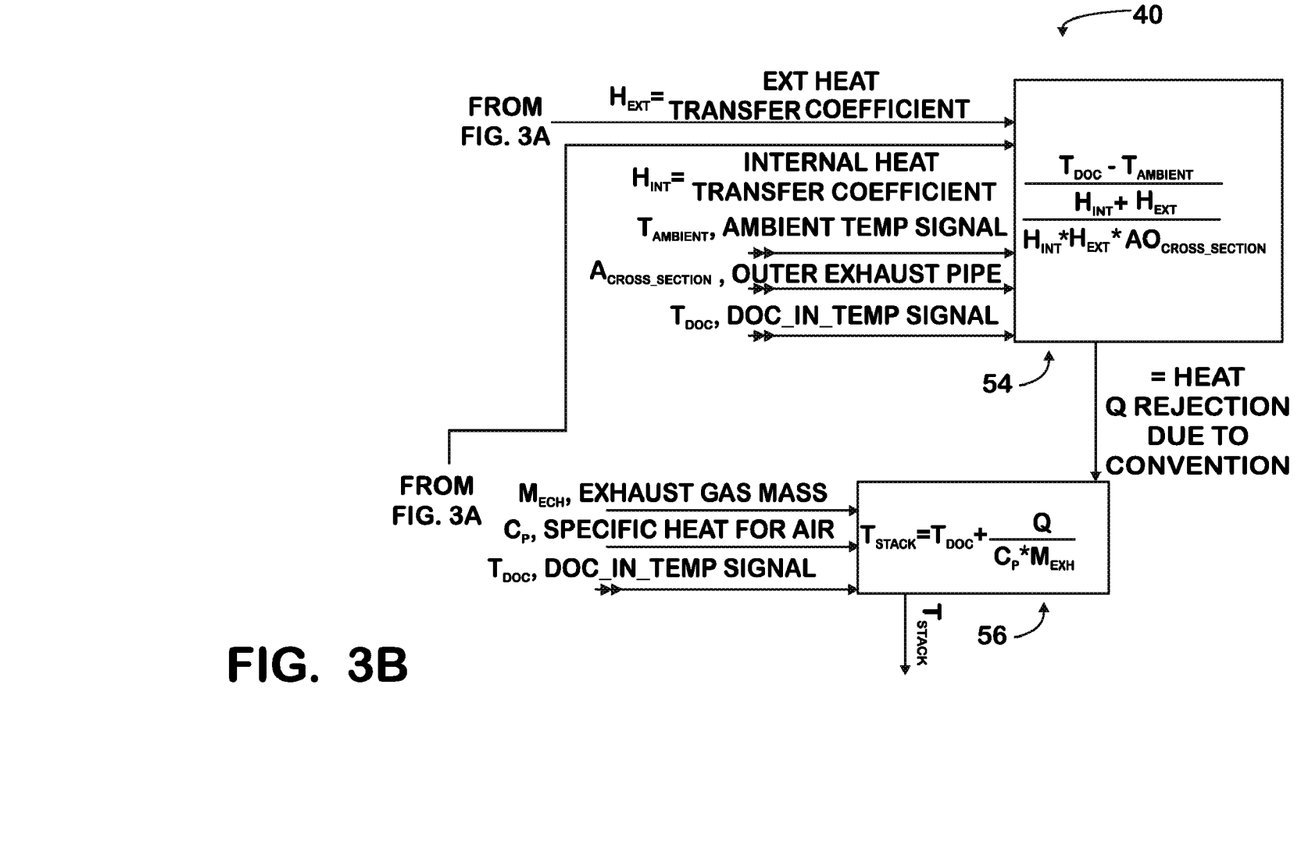

FIGS. 3A and 3B show detail of the heat-loss model represented by block 40 in FIG. 2. The model is implemented in processor 38 as an algorithm that when executed calculates a value for a parameter TSTACK that represents exhaust gas temperature leaving turbine 22T to enter the down pipe. The algorithm uses certain constants and variables to perform various preliminary calculations that include calculating an external heat transfer coefficient, $h_{ext}$, and calculating an internal heat transfer coefficient, $h_{int}$.

External heat transfer coefficient $h_{ext}$ is calculated using a mathematical model 44. The variables used in the calculation are the nominal outside diameter of the turbo downpipe DO, velocity of the exhaust gas flowing through the downpipe U, and the temperature measurement $T_{DOC}$ provided by sensor 30. The model uses a parameter DOC_In_Temp Signal corresponding to $T_{DOC}$ as the input to each of two converters 46, 48 for converting the DOC inlet temperature into a parameter V representing the kinematic viscosity of air and a parameter K representing thermal conductivity of air.

Internal heat transfer coefficient $h_{int}$ is calculated using a mathematical model 50. The variables used in the calculation are the nominal inside diameter of the turbo downpipe DI, the nominal internal transverse cross sectional area of the downpipe $A_{in\_cross\_section}$, ambient air temperature Ambient_Temp_Signal, engine speed N, engine torque TQI_SP, and ambient air pressure Ambient_Pres_Signal. Constants used in the calculation are the specific heat of air $C_p$, the viscosity of air µ, and the Prandtl number $P_r$.

Ambient air temperature Ambient_Temp_Signal, engine speed N, engine torque TQI_SP, and ambient air pressure Ambient_Pres_Signal are used in a mathematical model 52 for calculating the mass flow rate of exhaust gas $M_{exh}$ that is one of the parameters in model 50.

In addition to the external heat transfer coefficient $h_{ext}$ and the internal heat transfer coefficient $h_{int}$, ambient air temperature Ambient_Temp_Signal, the nominal transverse cross sectional area bounded by the outer surface of the downpipe Across_section, and DOC inlet temperature DOC_In_Temp Signal are used in a mathematical model 54 to yield a value, Q, for heat lost in the down pipe due to convection. Because the radiant heat loss is small in comparison to the convective heat loss, the former is not worth modeling.

The lost heat Q, the mass flow rate of exhaust gas $M_{exh}$, the DOC inlet temperature DOC_In_Temp Signal, and the specific heat of air $C_p$ are used in a mathematical model 56 for calculating a data value for TSTACK representing the temperature of exhaust gas leaving turbine 22T.

Figure 4:
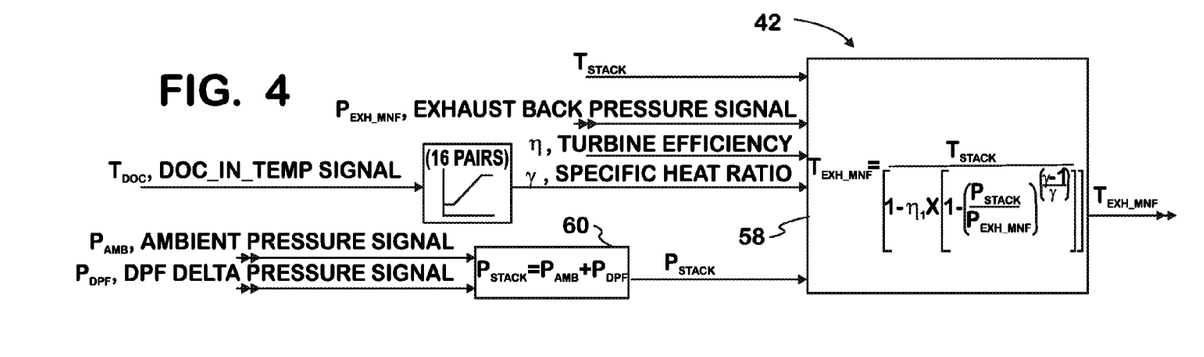
FIG. 4 is a schematic diagram showing more detail of another block of FIG. 2.

FIG. 4 shows detail of the model represented by block 42 in FIG. 2. The model is implemented as an algorithm in processor 38 that uses the calculated value for TSTACK as one variable used in a mathematical model 58 for calculating a value for $T_{ExeMnf}$ that represents exhaust gas temperature at exhaust manifold 18. The calculation also uses DOC inlet temperature DOC_In_Temp Signal to map a parameter □ representing Specific Heat Ratio of gases, exhaust back-pressure measured by a sensor at exhaust manifold 18 and converted to a corresponding value for a parameter $P_{exh\_mnf}$, ambient air pressure measured by a barometric pressure sensor and converted to a corresponding value for a parameter $P_{amb}$, and pressure loss across a diesel particulate filter that is downstream of DOC 30 in after-treatment system 26, $P_{dpf}$.

A calculation 60 sums $P_{dpf}$ and $P_{amb}$ to provide the pressure parameter $P_{stack}$. The efficiency of turbine 22T is a parameter ηt.

Figure 5:
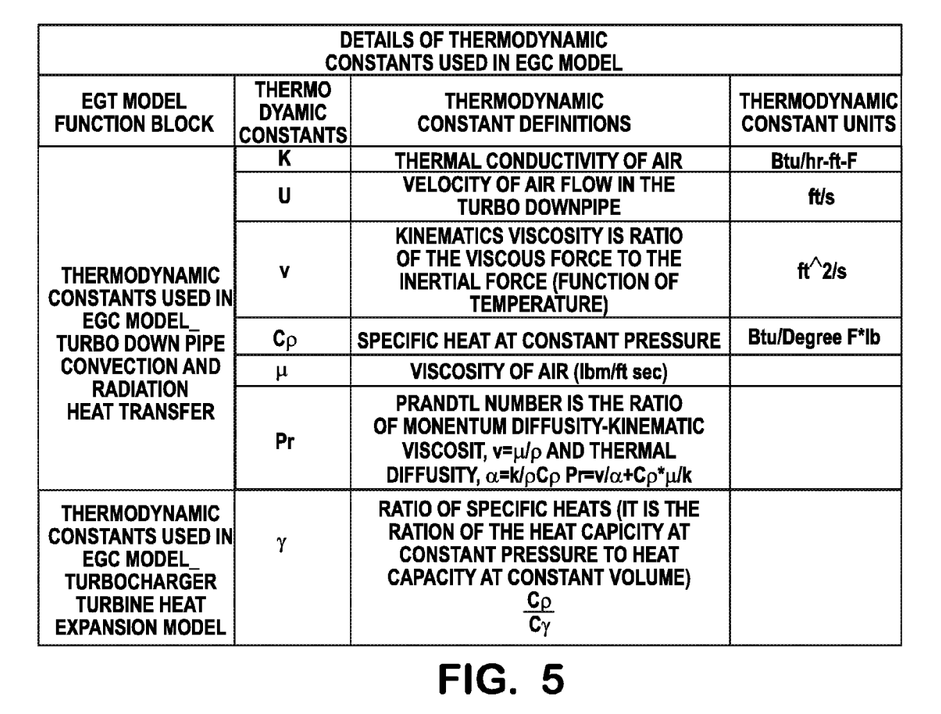
FIG. 5 is diagram defining certain parameters that appear in various Figures.
Figure 6:
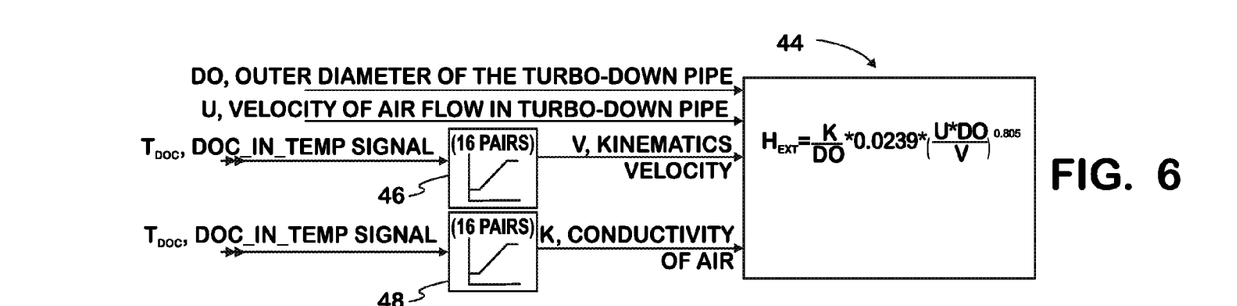
FIGS. 6 through 10 are enlarged views of correspondingly numbered blocks in the block diagram of FIG. 3.
Figure 7:
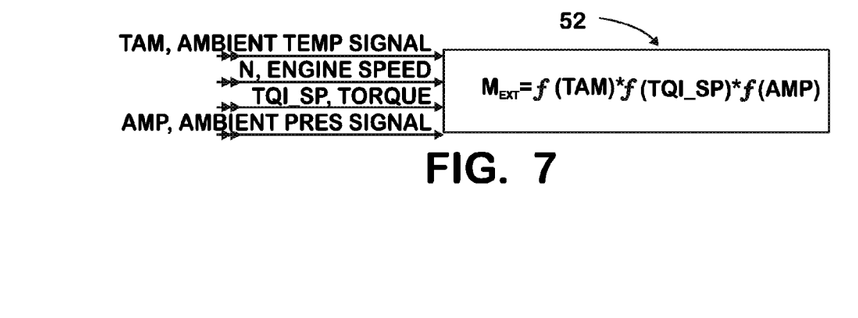
Figure 8:
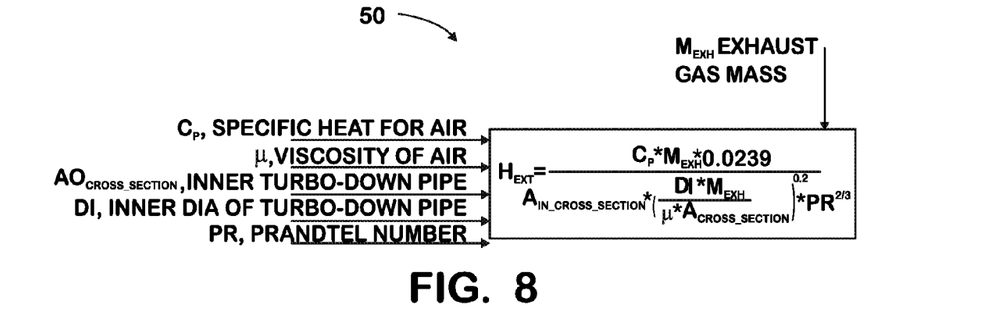
Figure 9:
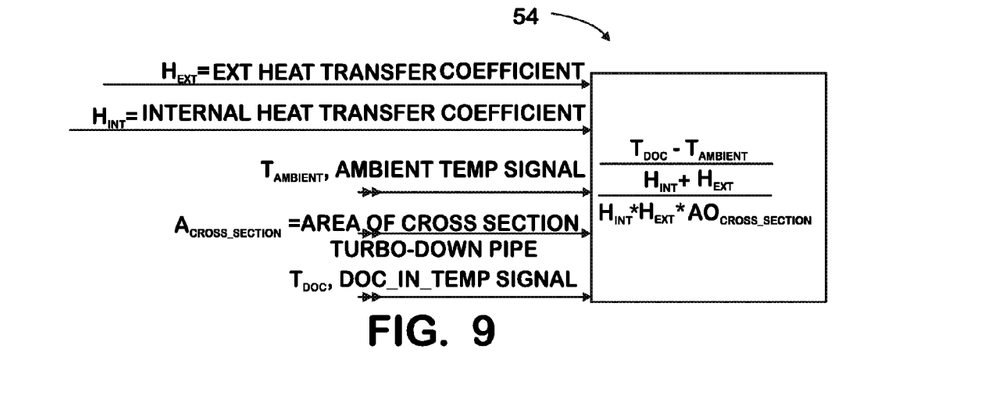
Figure 10:
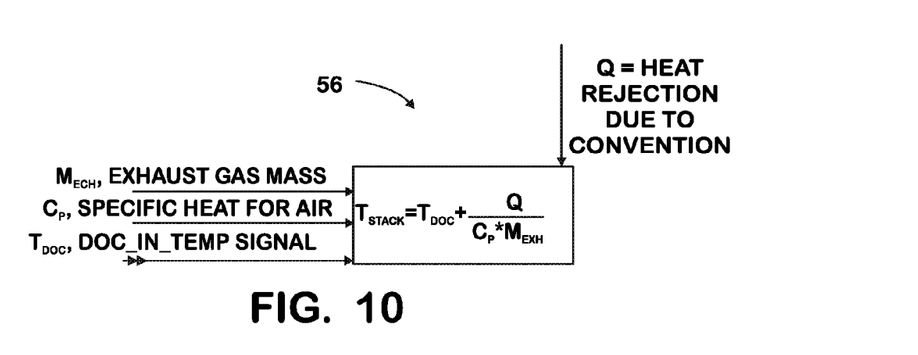

FIG. 5 is a chart that gives definitions of and units for thermodynamic constants that appear in the mathematical model that has been described.

What is claimed is:

1. An internal combustion engine comprising:
   an exhaust system which conveys exhaust gas created in engine combustion chambers to atmosphere and which comprises an exhaust manifold through which exhaust gas from the combustion chambers enters the exhaust system, an after-treatment device for treating exhaust gas before passing into the atmosphere, and a sensor providing data for temperature of exhaust gas entering the after-treatment device; and
   a processor comprising an algorithm that models temperature of exhaust gas at the exhaust manifold as a function of the data from the sensor and other data, including certain thermodynamic constants, certain geometry of the exhaust system, and certain variables related to operation of the engine, and that when executed, processes the data from the sensor and the other data to calculate temperature of exhaust gas at the exhaust manifold, in which the after-treatment device comprises a diesel oxidation catalyst and in which the algorithm comprises a first heat-loss model for modeling heat lost from exhaust gas during passage of exhaust gas from the exhaust manifold through a turbine of a turbocharger and a second heat-loss model for modeling heat lost from exhaust gas during passage through a pipe from the turbine to the diesel oxidation catalyst, and the algorithm, when executed, uses the heat-loss models to calculate a data value for temperature that is added to a data value for temperature from the sensor to calculate temperature of exhaust gas at the exhaust manifold.

2. An engine as set forth in claim 1 in which the first heat-loss model comprises a mathematical formula that contains a parameter for efficiency of the turbine, parameters for pressures at the inlet to and outlet from the turbine, and a parameter (y) representing Specific Heat Ratio of gases.

3. An engine as set forth in claim 1 in which the second heat-loss model comprises a mathematical formula that contains parameters for geometry of the pipe from the turbine to the diesel oxidation catalyst and parameters for engine speed and load.

4. An engine as set forth in claim 3 in which the mathematical formula of the second heat-loss model also contains parameters for barometric pressure and ambient temperature, and the algorithm, when executed, processes data values for the engine speed and load parameters and for the barometric pressure and ambient temperature parameters to calculate mass flow of exhaust gas entering the turbine from the exhaust manifold.

5. A method for inferring temperature of exhaust gas at an exhaust manifold of an internal combustion engine that has an exhaust system comprising an after-treatment device for treating exhaust gas passing through the exhaust system from the exhaust manifold and a sensor providing data for temperature of exhaust gas entering the after-treatment device, the method comprising:
   processing the data from the sensor and other data to infer temperature of exhaust gas at the exhaust manifold by executing an algorithm that models temperature of exhaust gas at the exhaust manifold as a function of data from the sensor and the other data, including certain constants, certain geometry of the exhaust system, and certain variables related to operation of the engine, in which the step of processing the data from the sensor and other data to infer temperature of exhaust gas at the exhaust manifold comprises processing temperature data for exhaust gas entering a diesel oxidation catalyst that performs an after-treatment function, in which the algorithm comprises a first heat-loss model for modeling heat lost from exhaust gas during passage through a turbine of a turbocharger and a second heat-loss model for modeling heat lost from exhaust gas during passage through a pipe from the turbine to the diesel oxidation catalyst, and in which the processing step comprises using the heat-loss models to calculate a data value for temperature that when added to the temperature data for exhaust gas entering the diesel oxidation catalyst provides a data value for inferred temperature of exhaust gas at the exhaust manifold.

6. A method as set forth in claim 5 in which the first heat-loss model comprises a mathematical formula that contains a parameter for efficiency of the turbine, parameters for pressures at the inlet to and outlet from the turbine, and a parameter (y) representing Specific Heat Ratio of gases, and in which the processing step comprises processing data values for efficiency of the turbine, for pressures at the inlet to and outlet from the turbine, and for specific heat ratio of air to exhaust gas to calculate the data value for temperature that when added to the temperature data for exhaust gas entering the diesel oxidation catalyst provides a data value for inferred temperature of exhaust gas at the exhaust manifold.

7. A method as set forth in claim 5 in which the second heat-loss model comprises a mathematical formula that contains parameters for geometry of the pipe from the turbine to the diesel oxidation catalyst and parameters for engine speed and load, and in which the processing step comprises processing data values for geometry of the pipe from the turbine to the diesel oxidation catalyst and for engine speed and load to provide a data value for inferred temperature of exhaust gas at the exhaust manifold.

8. A method as set forth in claim 7 in which the mathematical formula of the second heat-loss model also contains parameters for barometric pressure and ambient temperature, and in which the processing step comprises processing data values for engine speed and load and data values for the barometric pressure and ambient temperature to calculate mass flow of exhaust gas from the exhaust manifold to the turbine.

\* \* \* \* \*